US012168342B2

(12) United States Patent
Kajfosz et al.

(10) Patent No.: US 12,168,342 B2
(45) **Date of Patent: *Dec. 17, 2024**

(54) PRINTING PLATE PRESSURE ADJUSTMENT SYSTEM AND CAN DECORATOR EMPLOYING SAME

(71) Applicant: Stolle Machinery Company, LLC, Centennial, CO (US)

(72) Inventors: Bryon Lee Kajfosz, Littleton, CO (US); David Matthew Sebesta, Larkspur, CO (US); Karl Scott Fleischer, Denver, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,051

(22) Filed: May 11, 2023

(65) Prior Publication Data

US 2023/0278326 A1 Sep. 7, 2023

Related U.S. Application Data

(63) Continuation of application No. 17/357,603, filed on Jun. 24, 2021, now Pat. No. 11,685,149.

(51) Int. Cl.
*B41F 17/22* (2006.01)
*B41F 3/80* (2006.01)
(Continued)

(52) U.S. Cl.
CPC ................ *B41F 3/80* (2013.01); *B41F 17/14* (2013.01)

(58) Field of Classification Search
None
See application file for complete search history.

(56) References Cited

U.S. PATENT DOCUMENTS 2,160,613 A * 5/1939 Crafts ...................... B41F 13/28 101/247
10,882,306 B2 * 1/2021 Cochran ............... B41F 17/002
2021/0039381 A1 2/2021 Behnke et al.

FOREIGN PATENT DOCUMENTS

DE 4142754 A1 * 6/1993 .............. B41F 13/34
DE 19701216 A1 * 7/1998 .............. B41F 13/34
(Continued)

OTHER PUBLICATIONS

English translation of DE 10 2007 009 884 A1 to Kuendgen et al. from EPO, publication date Sep. 27, 2007. (Year: 2007).*
(Continued)

*Primary Examiner* — Leslie J Evanisko
(74) *Attorney, Agent, or Firm* — Eckert Seamans Cherin & Mellott, LLC

(57) ABSTRACT

A printing plate pressure adjustment system for a can decorator including a printing plate cylinder assembly having a printing plate cylinder drive shaft, and a blanket wheel. The system, includes an actuator, a control system structured to control operation of the actuator to adjust a pressure, between the printing plate cylinder assembly and the blanket wheel, an eccentric bushing disposed around the printing plate cylinder drive shaft, wherein rotation of the eccentric bushing causes the printing plate cylinder to move toward or away from the blanket wheel, and a drive mechanism coupled between the actuator and the eccentric bushing, wherein operation of the actuator causes the drive mechanism to rotate the eccentric bushing.

16 Claims, 11 Drawing Sheets

(51) Int. Cl.

| | |
|---|---|
| ***B41F 13/28*** | (2006.01) |
| ***B41F 17/14*** | (2006.01) |

(56) References Cited

FOREIGN PATENT DOCUMENTS

| | | | | | |
|---|---|---|---|---|---|
| DE | 102007009884 | A1 | * | 9/2007 | B41F 13/28 |
| DE | 102015204557 | A1 | * | 9/2016 | B41F 13/34 |
| DE | 102017124979 | A1 | * | 5/2018 | |
| EP | 0337801 | A2 | * | 10/1989 | |
| JP | 2851607 | | | 1/1999 | |
| WO | 2006123728 | A1 | | 11/2006 | |

OTHER PUBLICATIONS

English translation of DE 10 2017 124 979 A1 to Jager et al. from EPO, publication date May 3, 2018. (Year: 2018).*
English language translation of DE 10 2015 204 557 A1 to Halbach, publication date Sep. 15, 2016. (Year: 2016).*
English language translation of DE 197 01 216 A1 to Sachers, publication date Jul. 23, 1998. (Year: 1998).*
English language translation of DE 41 42 754 A1 to Jentzsch et al., publication date Jun. 24, 1993. (Year: 1993).*
European Patent Office, EP22828998.9, Extended European Search Report, Oct. 2, 2024, 8 pages.

* cited by examiner

PRINTING PLATE PRESSURE ADJUSTMENT SYSTEM AND CAN DECORATOR EMPLOYING SAME

CROSS REFERENCE TO RELATED APPLICATIONS

This application is a continuation patent application of and claims priority to U.S. patent application Ser. No. 17/357,603, filed Jun. 24, 2021, now U.S. Pat. No. 11,685,149, issued Jun. 27, 2023.

FIELD OF THE INVENTION

The disclosed concept relates generally to an adjustment system for a can decorator used in the food and beverage packaging industries and, more particularly, to an adjustment system for a can decorator that is structured to adjust pressure between a printing plate and a blanket wheel.

BACKGROUND OF THE INVENTION

High speed continuous motion machines for decorating cans, commonly referred to as "can decorator machines" or simply "can decorators," are generally well known. FIG. 1 shows a can decorator 2. As shown in FIG. 1, a can decorator 2 includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carriers wheel 18 adjacent its periphery. Downstream from the infeed conveyor 15, each spindle or mandrel is m closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket engages a plurality of printing cylinders 31, each of which is associated with an individual ink station assembly 32 (an exemplary eight ink station assemblies 32 are shown in FIG. 1). Typically, each assembly 32 provides a different color ink and each printing cylinder 31 applies a different ink image segment to the blanket. All of the "ink image" segments combine to produce a "main image" that is structured to be applied to the can body. The "main image" is then transferred to undecorated cans 16 and becomes, as used herein, the "can body applied image."

Each ink station assembly 32 includes a plurality of rollers, or as used herein, "rolls," that are structured to transfer a quantity of ink from a reservoir, or as used herein an "ink-fountain," to the blanket. The path that the ink travels is, as used herein, identified as the "ink train." That is, the rolls over which the ink travels define the "ink train." Further, as used herein, the "ink train" has a direction with the ink fountain being at the "upstream" end of the ink train and a priming cylinder 31 at the "downstream" end of the ink train.

The ink train extends over a number of rolls each of which has a purpose. As shown, the ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the printing cylinder 31. For example, the oscillator rolls are structured to reciprocate longitudinally about their axis of rotation so as to spread the ink as it is applied to the next downstream roll. The final roll is the printing cylinder 31 which applies the ink to the blanket. It is understood that each ink station assembly 32 applies an "ink image" of a single selected color to the blanket and that each ink station assembly 32 must apply is ink image in a proper position relative to the other ink images so that the main image does, not have offset ink images.

Thus, as used herein, an "ink image" means the image of a single ink color which is part of a "main image." As used herein, a "main image" means an image created from a number of ink images and which is the image that is applied to a can body as the "can body applied image." It is understood that a "main image" includes a number, and typically a plurality, of ink images. For example, if the main image was the French flag (which is a tricolor flag featuring three vertical bands colored blue (hoist side), white, and red), an ink station assembly 32 with blue ink would provide an ink image that is a blue rectangle, an ink station assembly 32 with white ink would provide an ink image that is a white rectangle and an ink station assembly 32 with red ink would provide an ink image that is a red rectangle. Further, presuming that the main image was of a French flag with the hoist side on the left, the ink station assembly 32 with blue ink would provide the blue rectangle ink image on the left side of the blanket, the ink station assembly 32 with white ink would provide the white rectangle ink image on the center of the blanket immediately adjacent the blue rectangle ink image, and the ink station assembly 32 with red ink would provide the red rectangle ink image on the right side of the blanket immediately adjacent the white rectangle ink image. Once all the ink images are applied to the blanket, the main image is formed and then applied to a can body.

Each ink station assembly 32 is structured so that the final roll(s) before the printing cylinder 31 apply a proper amount of ink to the printing cylinder 31. Those of skill in the an know the amount of ink required so as to produce an image with an intended clarity, resolution and hue. Thus, as would be understood by those of skill in the art, and as used herein, the “proper” amount of ink is an amount that is neither too little (which typically results in a faint image) nor too much (which typically results in a blurred image), i.e., a “proper” amount of ink is an amount of ink that results in the image being produced with the intended clarity, resolution and hue. Further, the “proper” amount of ink applied to a printing cylinder 31 is also a film with a substantially consistent thickness. It is understood that those of skill in the art know the amount of ink to be applied to a substrate such as, but not limited to a can body, that is required to produce an image with the intended clarity, resolution and hue.

Similarly, each ink station assembly 32 is structured so that the printing cylinder 31 applies the ink image in a proper location on the blanket. Those of skill in the art know where the ink should be located on a printing cylinder 31 so as to produce the image as intended. Further, as would be understood by those of skill in the art, and as used herein, the “proper location” of the ink image means that the ink image is applied to the blanket in the position intended relative to the other ink images applied by other ink station assemblies 32 and that all ink images form a main image wherein the individual ink images do not overlap in an unintended manner. Further, the “proper location” of the ink images means that the ink images, and therefore the main image, has the intended sidelay registration and the intended circumferential registration. As used herein, the “intended” sidelay/circumferential registration means that the sidelay/circumferential registration is such that the can body applied image is the intended image. As used herein, the “intended image” means the image as created by the creator of the image, as would be understood by those of skill in the art. As used herein, the “can body applied image” means the image as applied to a can body; i.e., the image that is on the can body after a printing operation is complete.

Thus, it is important to supply the printing cylinder 31 with as consistent of an ink film thickness, as possible, in order for the printing plate to impart a clear and consistent image to the printing blanket and ultimately to the final printed substrate (e.g., can 16). Inconsistencies in the ink film can result in variable color density across the printed image, as well as the possibility of “starvation ghosting” of the image, wherein a lighter duplicate version or copy of the image is undesirably applied to the can 16 in addition to the main image.

Generally, control of the ink train is accomplished by a technician that monitors the can decorator output and who manually adjusts various elements of the ink station assemblies and/or the blanket wheel to so that the ink is applied in a proper amount and in a proper position. For example, the pressure of the printing cylinders 31 against the blanket 21 is adjustable. Typically, this adjustment assembly includes a manually turned knob operatively connected to an eccentric shaped bushing in the printing cylinder 31. Operation of the knob causes a surface of the printing cylinder 31 to move closer or further from a surface of the blanket 21, with moving closer increasing pressure and moving further decreasing pressure. Too much pressure can degrade image quality with defects such as dot gain, dark print, rough edges due to a buildup of ink, or a stretched image. Too little pressure can also degrade image quality with defects such as light print or missing print. Manual adjustment can be inconsistent. Some systems use electronic positioning systems, which rely on stepper or servo motors that may not stand up to the environment in which they are used, and can be costly.

The image quality issues noted above, and the need for manually correcting these errors, are problems. Further, if the can image is out of specification either during the start of the label or during the run of the label, it is possible to accumulate a large amount of scrap cans and, therefore, lost production in a short amount of time. This is a problem. There is, therefore, room for improvement in can decorating machines and methods, and in ink station assemblies.

SUMMARY OF THE INVENTION

These needs, and others, are met by at least one embodiment of the disclosed concept which provides a printing plate pressure adjustment system for a can decorator including a printing plate cylinder assembly having a printing plate cylinder drive shaft, and a blanket wheel, the system comprising: an actuator; a control system structured to control operation of the actuator to adjust a pressure between the printing plate cylinder assembly and the blanket wheel; an eccentric bushing disposed around the printing plate cylinder drive shaft, wherein rotation of the eccentric bushing causes the printing plate cylinder to move toward or away from the blanket wheel; and a drive mechanism coupled between the actuator and the eccentric bushing, wherein operation of the actuator causes the drive mechanism to rotate the eccentric bushing.

These needs, and others, are met by at least one embodiment of the disclosed concept which provides a printing plate pressure adjustment system for a can decorator including a printing plate cylinder assembly having a printing plate cylinder drive shaft and an eccentric bushing disposed around the printing plate cylinder drive shaft, and a blanket wheel, wherein rotation of the eccentric bushing causes the printing plate cylinder to move toward or away from the blanket wheel, said system comprising: an actuator; a drive mechanism coupled between the actuator and the eccentric bushing, the drive mechanism including: a worm gear structured to rotate in response to operation of the actuator; an eccentric pivot operatively coupled to the worm gear and structured to rotate with rotation of the worm gear; and an elongated member coupled between the eccentric pivot and the eccentric bushing, wherein the elongated member is structured to rotate the eccentric bushing in response to rotation of the eccentric pivot.

These needs, and others, are met by at least one embodiment of the disclosed concept which provides a can decorator comprising: a blanket wheel; a printing plate cylinder assembly having a printing plate cylinder drive shaft and an eccentric bushing disposed around the priming plate cylinder drive shaft, wherein rotation of the eccentric bushing causes the printing plate cylinder to move toward or away from the blanket wheel; and a printing plate pressure adjustment assembly including: an actuator; a control system structured to control operation of the actuator to adjust a pressure between the printing plate cylinder assembly and the blanket wheel; and a drive mechanism coupled between the actuator and the eccentric bushing, wherein operation of the actuator causes the drive mechanism to rotate the eccentric bushing.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
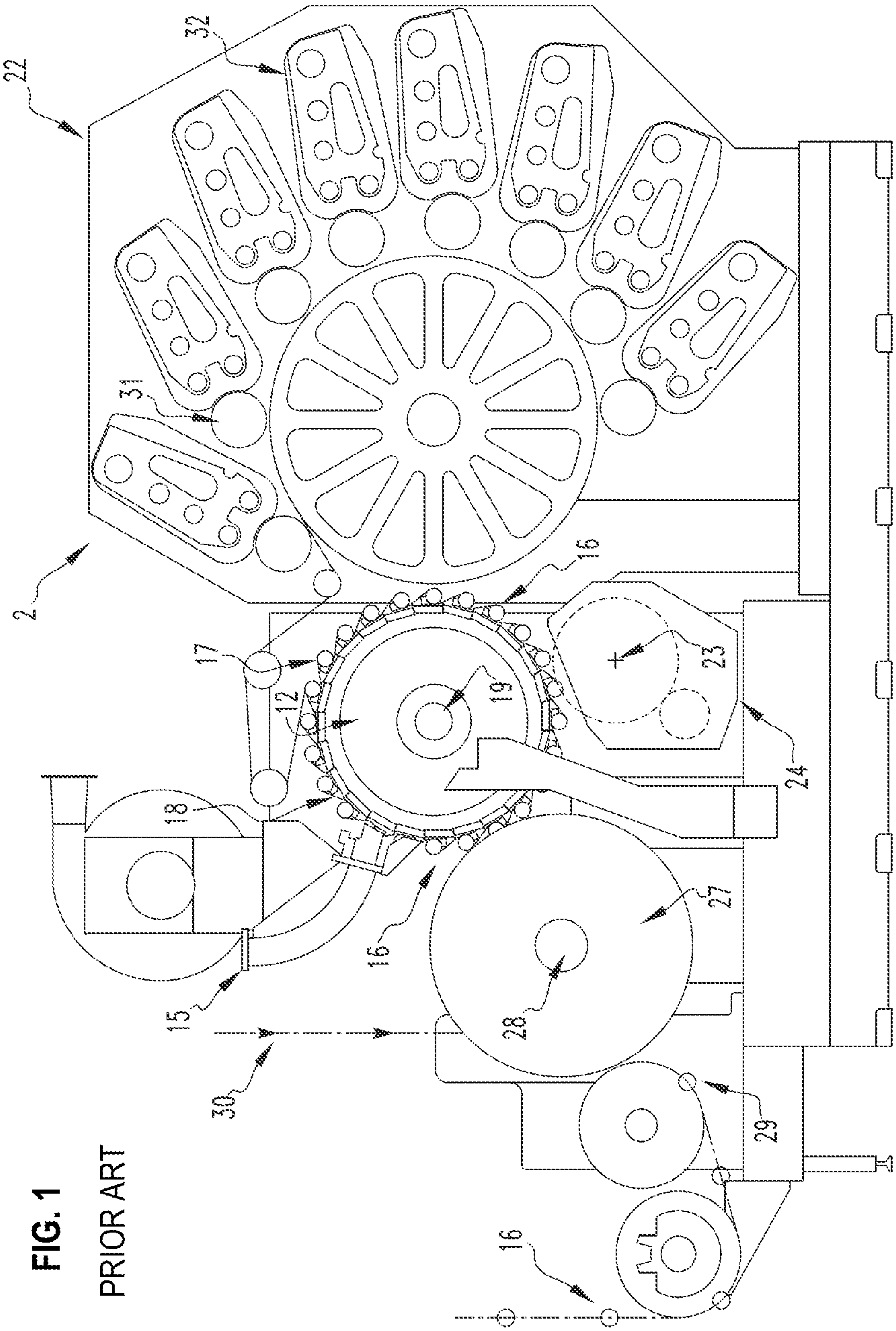
FIG. 1 PRIOR ART
FIG. 1 is a side elevation view of a prior art can decorator machine.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, in a term such as, but not limited to, "[X] structured to [verb] [Y]," the "[Y]" is not a recited element. Rather, "[Y]" further defines the structure of "[X]." That is, assume in the following two examples "[X]" is "a mounting" and the [verb] is "support." In a first example, the full term is "a mounting structured to support a flying bird." That is, in this example, "[Y]" is "a flying bird." It is known that flying birds, as opposed to swimming/walking birds, typically grasp a branch for support. Thus, for a mounting, i.e., "[X]," to be "structured" to support a flying bird, the mounting is shaped and sized to be something a flying bird is able to grasp similar to a branch. This does not mean, however, that the bird is being recited. In a second example, "[Y]" is a house; that is, the second exemplary term is "a mounting structured to support a house." In this example, the mounting is structured as a foundation as it is well known that houses are supported by foundations. As before; a house is not being recited, but rather defines the shape, size, and configuration of the mounting, i.e., the shape, size, and configuration of "[X]" in the term "[X.] structured to [verb] [Y]."

As used herein, "associated" means that the elements are part of the same assembly and/or operate together, or, act upon/With each other in some manner. For example, an automobile has four tires and four hubcaps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component includes a nut (as well as an opening through which the bolt extends) or threaded bore.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintainer substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another, without the opposite being true. With regard to electronic devices, a first electronic device is "operatively coupled" to a second electronic device when the first electronic device is structured to, and does, send a signal or current to the second electronic device causing the second electronic device to actuate or otherwise become powered or active.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book, simply resting on a table, i.e., the book is not glued or fastened to the table, is "temporarily disposed" on the table.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, "operatively engage" means "engage and move." That is, "operatively engage" when used m relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled." to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours. With regard to elements/assemblies that are movable or configurable, "corresponding" means that when elements/assemblies are related and that as one element/assembly is moved/reconfigured, then the other element/assembly is also moved/reconfigured in a predetermined manner. For example, a lever including a central fulcrum and elongated board, i.e., a "see-saw" or "teeter-totter," the board has a first end and a second end. When the board first end is in a raised position, the board second end is in a lowered position. When the board first end is moved to a lowered position, the board second end moves to a "corresponding" raised position. Alternately, a cam shaft in an engine has a first lobe operatively coupled to a first piston. When the first lobe moves to its upward position, the first piston moves to a "corresponding" upper position, and, when the first lobe moves to a lower position, the first piston, moves to a "corresponding" lower position.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the word "unitary" means a component that is created as a single piece or unit. That is, a component that includes pieces that are created separately and then coupled together as a unit is not a "unitary" component or body.

As used herein "unified" means that all the elements of an assembly are disposed in a single location and/or within a single housing, frame or similar construct.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to, or along, a central longitudinal axis of the cylinder.

As used herein, a "tension member" is a construct that has a maximum length when exposed to tension, but is otherwise substantially flexible, such as, but not limited to, a chain or a cable.

As used herein, "generally curvilinear" includes elements having multiple curved portions, combinations of curved portions and planar portions, and a plurality of linear/planar portions or segments disposed at angles relative to each other thereby forming a curve.

As used herein, an "elongated" element inherently includes a longitudinal axis and/or longitudinal line extending in the direction of the elongation.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, "substantially" means "by a large amount or degree" relevant to the term being modified as would be understood by one of ordinary skill in the art.

As used herein, "at" means on and/or near relevant to the term being modified as would be understood by one of ordinary skill in the art.

As used herein, "in electronic communication" is used in reference to communicating a signal via an electromagnetic wave or signal. "In electronic communication" includes both hardline and wireless forms of communication; thus, for example, a "data transfer" or "communication method" via a component "in electronic communication" with another component means that data is transferred from one computer to another computer (or from one processing assembly to another processing assembly) by physical connections such as USB, Ethernet connections or remotely such as NFC, blue tooth, etc. and should not be limited to any specific device.

As used herein, "in electric communication" means that a current passes, or can pass, between the identified elements. Being "in electric communication" is further dependent upon an element's position or configuration. For example, in a circuit breaker, a movable contact is "in electric communication" with the fixed contact when the contacts are in a closed position. The same movable contact is not "in electric communication" with the fixed contact when the contacts are in the open position.

As used herein, a "computer" is a device structured to process data having at least one input device, e.g., a keyboard, mouse, or touch-screen, at least one output device, e.g., a display, a graphics card, a communication device, e.g., an Ethernet card or wireless communication device, permanent memory, e.g., a hard drive, temporary memory, i.e., random access memory, and a processor, e.g., a programmable logic circuit. The "computer" may be a traditional desktop unit but also includes cellular telephones, tablet computers, laptop computers, as well as other devices, such as gaming devices that have been adapted to include components such as, but not limited to, those identified above. Further, the "computer" may include components that are physically in different locations. For example, a desktop unit may utilize a remote hard drive for storage. Such physically separate elements are, as used herein, a "computer."

As used herein, the word "display" means a device structured to present a visible image. Further, as used herein, "present" means to create an image on a display which may be seen by a user.

As used herein, a "computer readable medium" includes, but is not limited to, hard drives, CDs, DVDs, magnetic tape, floppy drives, and random access memory.

As used herein, "permanent memory" means a computer readable storage medium and, more specifically, a computer readable storage medium structured to record information in a non-transitory manner. Thus, "permanent memory" is limited to non-transitory tangible media.

As used herein, "stored in the permanent memory" means that a module of executable code, or other data, has become functionally and structurally integrated into the storage medium.

As used herein, a "file" is an electronic storage construct for containing executable code that is processed, or, data that may be expressed as text, images, audio, video or any combination thereof.

As used herein, a "module" is an electronic construct used by a computer, or other processing assembly, and includes, but is not limited to, a computer file or a group of interacting computer files such as an executable code file and data storage files, used by a processor and stored on a computer readable medium. Modules may also include a number of other modules. It is understood that modules may be identified by their purpose of function. Unless noted otherwise, each "module" is stored in, i.e., incorporated into, permanent memory of at least one computer or, processing assembly. As such, and as used herein, all modules define constructs and do not recite a function. All modules are shown schematically in the Figures.

As used herein, "structured to [verb]" when used in relation to a module, means that the module includes executable computer instructions, code, or similar elements that are designed and intended to achieve the purpose of the module. As noted above, all modules are incorporated into permanent memory and, as such, define constructs and do not recite a function.

As used herein, "automatic" means a construct that operates without human input/action. A construct is "automatic" even if it needs a human to initially set it up or install it and/for perform maintenance or calibration so long as the construct generally performs thereafter without human input/action.

As used herein, the term "can" refers to any known or suitable container, which is structured to contain a substance (e.g., without limitation, liquid; food; any other suitable substance), and expressly includes, but is not limited to, food cans, as well as beverage cans, such as beer and soda cans.

Figure 2:
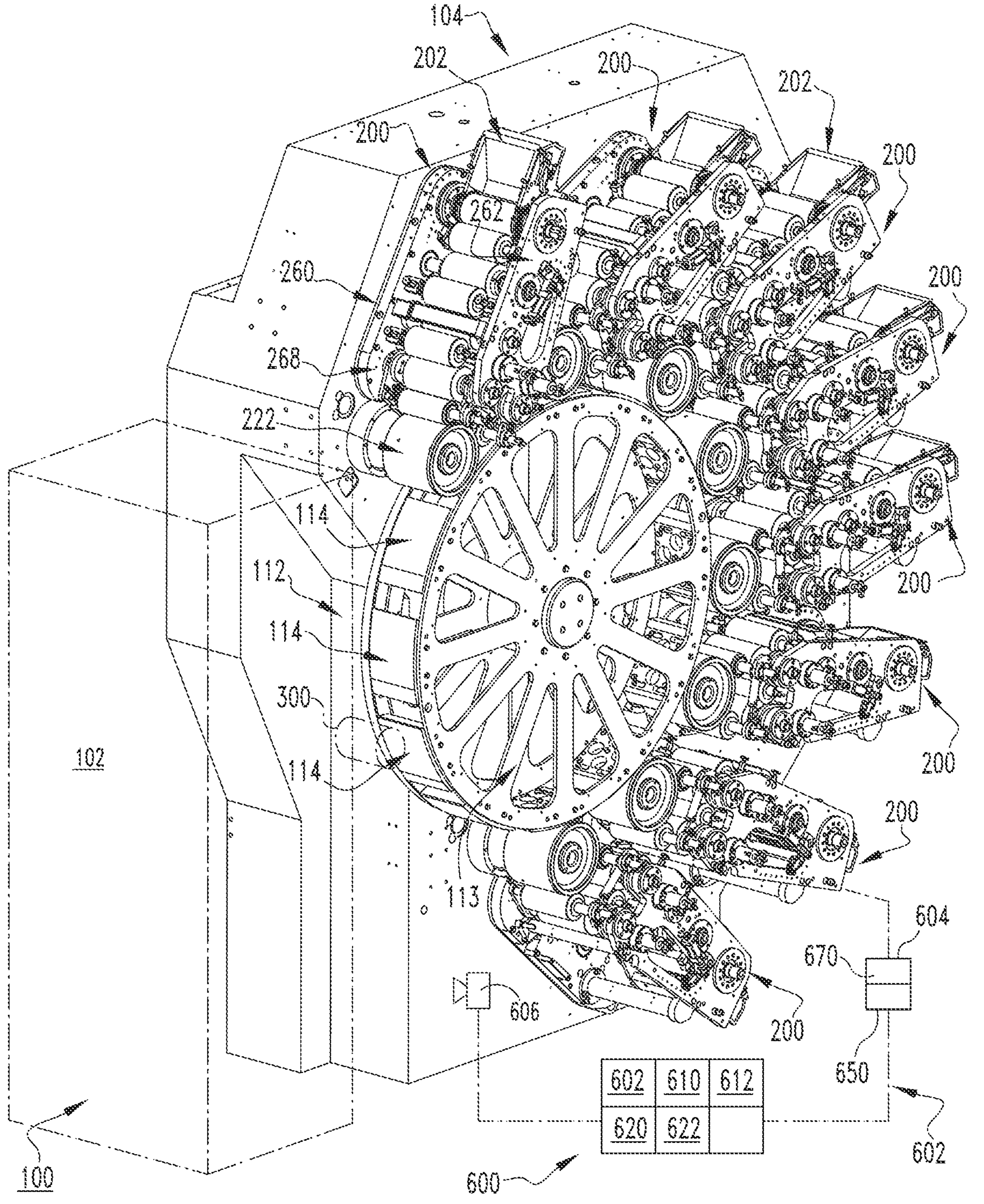
FIG. 2 is an isometric view of a portion of a can decorator machine and ink station assembly therefor, in accordance with an embodiment of the disclosed concept.

As shown in FIG. 2, a can decorator machine 100 (alternately as used herein a "can decorator 100") includes a can transport assembly 102 (shown schematically) and an ink application system 104. The can transport assembly 102 is substantially similar to the can transport construct described above, the description of which is incorporated herein. Generally, the can transport assembly 102 is structured to move a number of undecorated can bodies 300 into contact with the ink application system 104 and, as shown, a blanket wheel 112 and/or an image transfer segment 114, as discussed below.

The ink application system 104 is structured to apply ink in a selected pattern to the exterior of each can body 300. That is, the ink application system 104 includes a plurality of ink station assemblies 200 (eight are shown) and a blanket wheel 112. The blanket wheel 112 is an assembly that includes a wheel frame 113 (i.e. frame forming a generally disk-like body) with a plurality of image transfer segments 114 (shown in phantom line drawing in FIG. 4) disposed on the radial surface thereof. Preferably, the blanket wheel 112 is structured to transfer a main image (that includes a plurality of combined. "ink images") from each image transfer segment 114 to a corresponding one of the can bodies 300.

As previously noted, the can decorator 100 further includes a plurality of ink station assemblies 200. It will be appreciated that, while the can decorator 100 in the example shown and described herein includes eight ink station assemblies 200, that it could alternatively contain any known or suitable alternative number and/or configuration of ink station assemblies (not shown), without departing from the scope of the disclosed concept. It will further be appreciated that, for economy of disclosure and simplicity of illustration, only one of the ink station assemblies 200 will be shown and described in detail herein.

Figure 3:
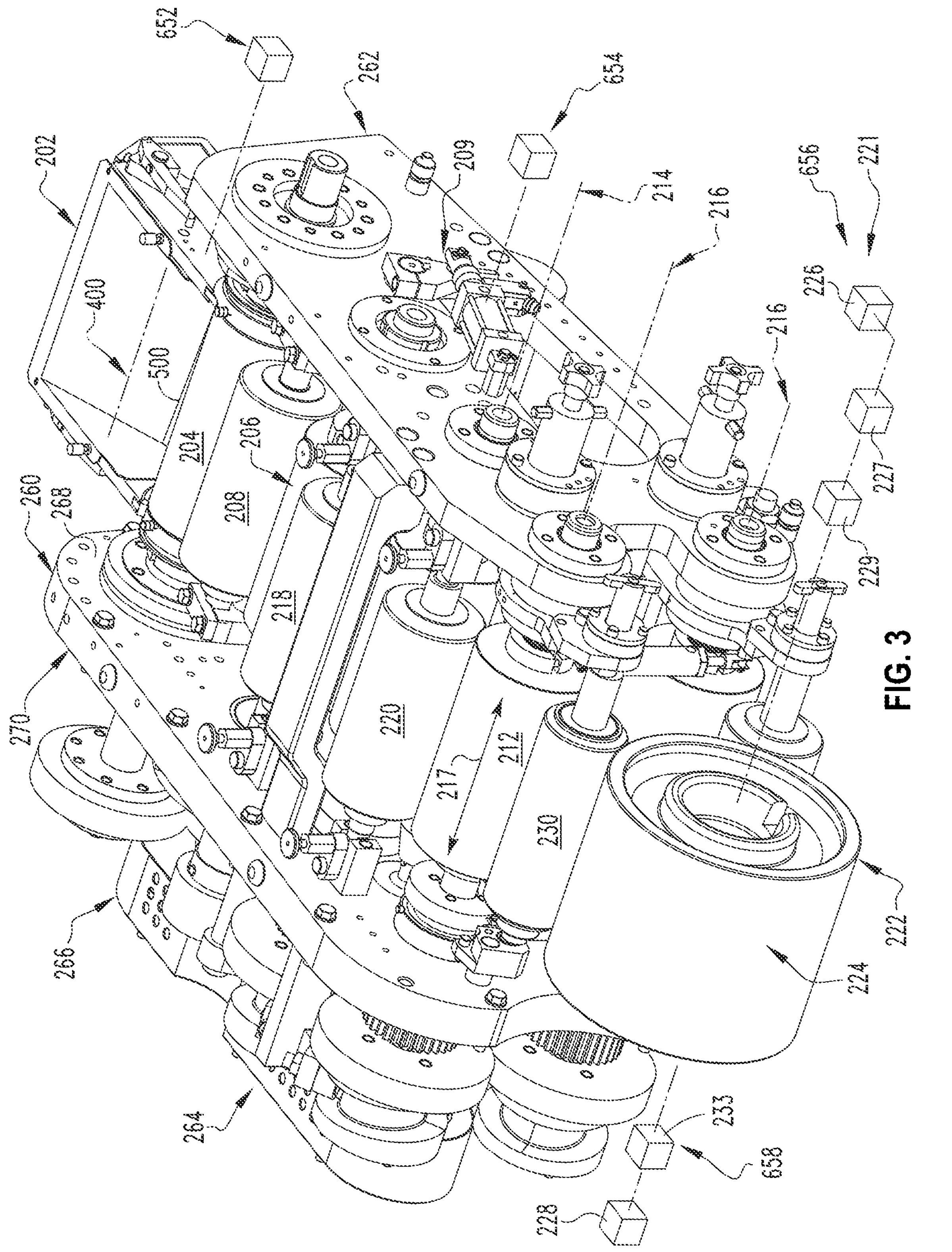
FIG. 3 is a partially schematic isometric view of one of the ink station assemblies of FIG. 2.
Figure 4:
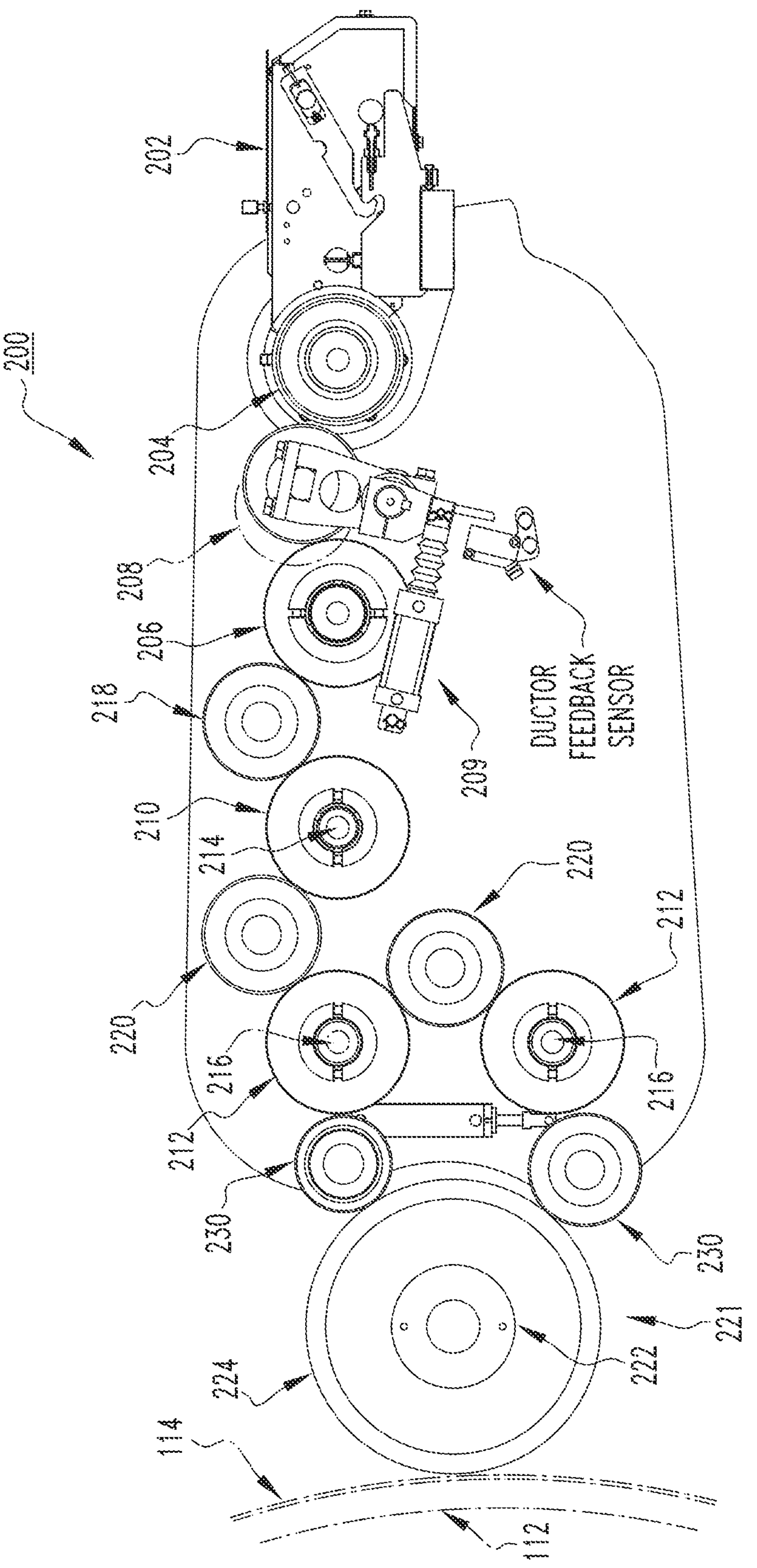
FIG. 4 is a side elevation view of the ink station assembly of FIG. 3 with one of the side plates removed to show hidden structures.

FIGS. 3 and 4 show one non-limiting example embodiment of the ink station assembly 200 in greater detail. Specifically, the ink station assembly 200 includes an ink fountain 202 structured to provide a supply of ink 400 (shown in phantom line drawing in simplified form FIG. 3; see also FIG. 5). A fountain roll 204 receives the ink 400 from the ink fountain 202. The ink station assembly 200 further includes a distributor roll 206 and a ductor roll 208 that is co-operable with both the fountain roll 204 and the distributor roll 206 to transfer the ink 400 from the fountain roll 204 to the distributor roll 206. That is, the ductor roll 208 is part of a ductor roll assembly that further includes a duty cycle adjustment assembly 209 that is structured to cause the ductor roll 208 to reciprocate between two positions a first position wherein the doctor, roll 208 engages the fountain roll 204 thereby causing ink to transfer from the fountain roll 204 to the ductor roll 208 and wherein the ductor roll 208 is spaced from the distributor roll 206, and, a second position, wherein the doctor roll 208 is spaced from the fountain roll 204 and wherein the ductor roll 208 engages the distributor roll 206 thereby causing ink to transfer from the ductor roll 208 to the distributor roll 206. The duty cycle adjustment assembly 209 is structured to alter the duty cycle of the ductor roll 208 (see adjusted position of ductor roll 208 shown in phantom line drawing, in FIG. 4). That is, the duty cycle adjustment assembly 209 is structured to alter the length of time the doctor roll 208 engages the fountain roll 204.

Further, a number of oscillator rolls 210, 212 (two, are shown) each have a longitudinal axis 214, 216, respectively. The oscillator rolls 210, 212 are structured to, and do, oscillate back and forth along their longitudinal axes 214, 216. By way of example, and without limitation, oscillator roll 212 oscillates back and forth along axis 216 in the directions generally indicated by arrow 217. Oscillator roll 210 oscillates back and forth along longitudinal axis 214 in a similar manner.

The example ink station assembly 200 also includes two transfer rolls 218, 220, each of which cooperates with at least one of the oscillator rolls 210, 212. It will be appreciated, however, that any known or suitable alternative number and/or configuration of transfer rolls (not shown) other than that which is shown and described herein, could be employed without departing from the scope of the disclosed concept.

Figure 5:
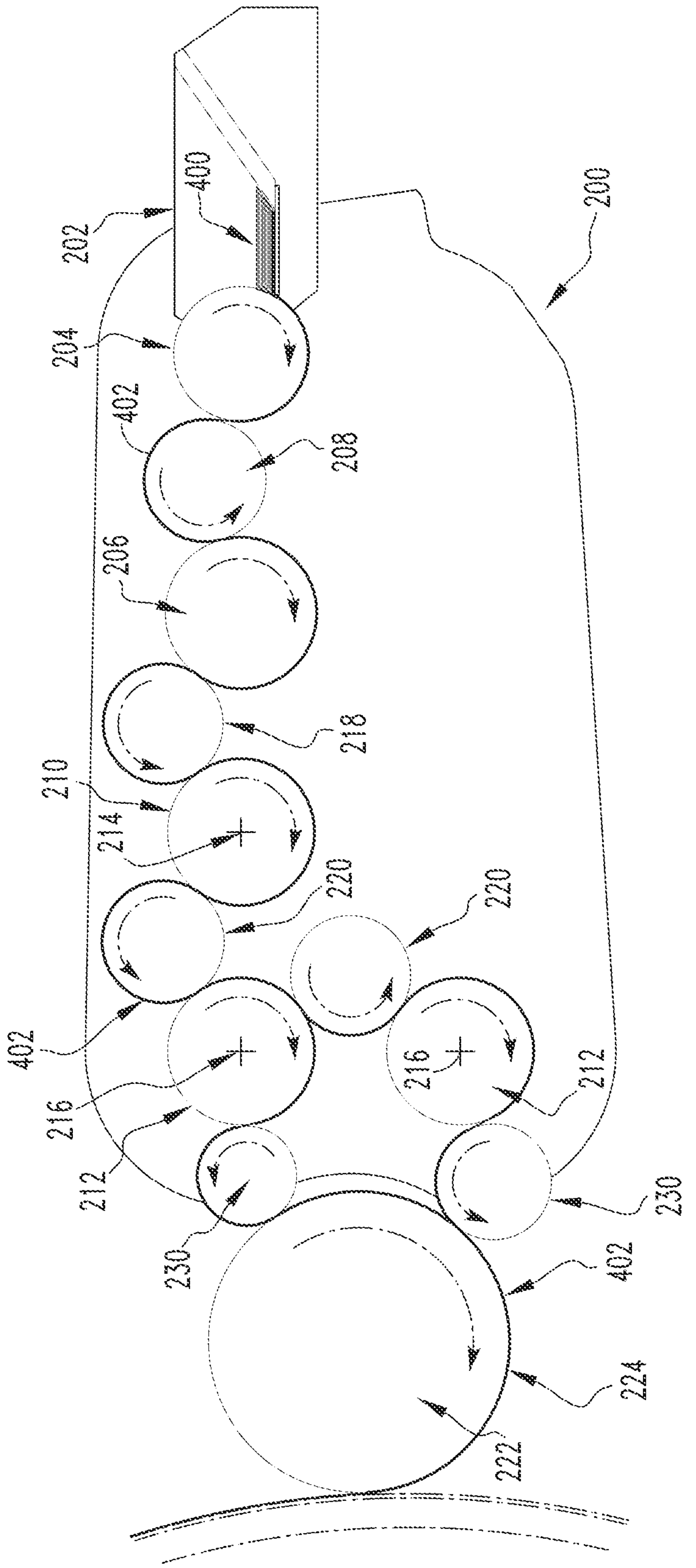
FIG. 5 is a schematic side view of an ink station assembly showing the ink train.

A printing plate cylinder assembly 221 includes a printing plate cylinder 222 having a printing plate (generally indicated by reference number 224) as well as a printing plate cylinder axial adjustment assembly 226 and a circumferential adjustment assembly 228, shown schematically in FIG. 3. The printing plate cylinder 222 cooperates with a number of form roll 230 to apply the ink 400 to the printing plate 224. As noted above, the printing plate cylinder 222 engages a blanket wheel 112 and/or an image transfer segment 114. The blanket wheel 112 (FIGS. 2 and 4) and/or an image transfer segment 114 (FIGS. 2 and 4) engages a can body 300 (FIG. 2) thereby transferring the ink to the can body 300 (shown in simplified form in phantom line drawing in FIG. 2). Thus, generally, each ink station assembly 200 defines an "ink train 402," as shown in FIG. 5, whereby ink 400 is transferred from the fountain roll 204 to the form roll 230 as described above. Moreover, one broad purpose of the various rolls discussed above is to spread the ink so as to form a thin ink film and disperse the ink so that the ink film has a substantially uniform thickness when applied to the printing plate 224. That is, the ink 400 on the various rolls, e.g., distributor roll 206, is in the form of a film that is sequentially thinned and evenly distributed over the surface of the rolls.

As best shown in FIG. 3, the ink station assembly 200 further includes first and second opposing side plates 260, 262, a drive assembly 264, and a housing 266 at least partially enclosing the drive assembly 264. The first side plate 260 has first and second opposing sides 268, 270. The fountain roll 204, the distributor roll 206, the ductor roll 208, the oscillator rolls 210, 212, the transfer rolls 218, 220, and the single form roll 230 are all rotatably disposed between the first side plate 260 and the second side plate 262. The drive assembly 264 is disposed on the second side 270 of the first side plate 260, and is structured to drive at least the fountain roll 204, distributor roll 206, and oscillator rolls 210, 212, in a generally well known manner.

Figure 6:
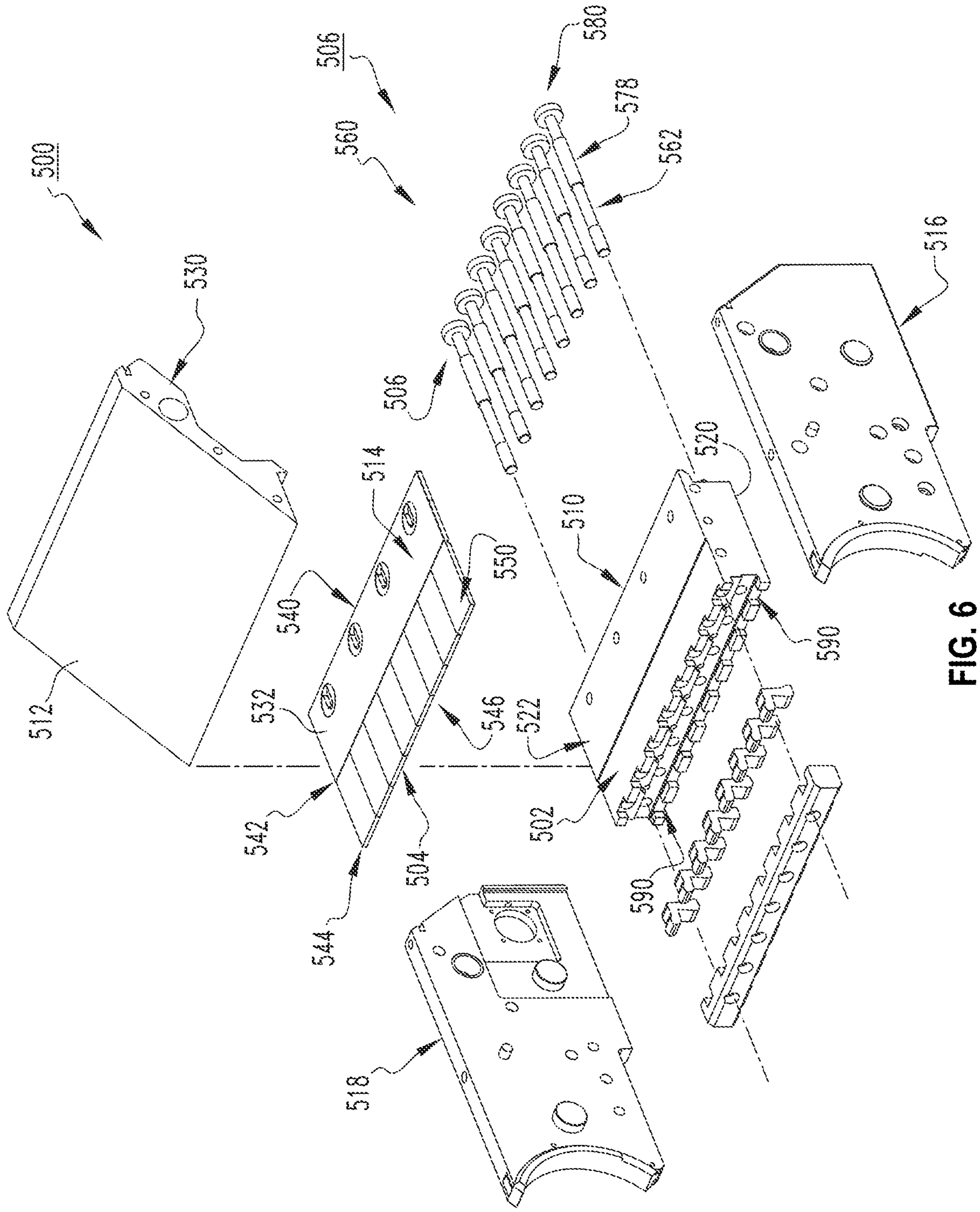
FIG. 6 is an exploded isometric view of an ink application adjustment assembly.
Figure 7:
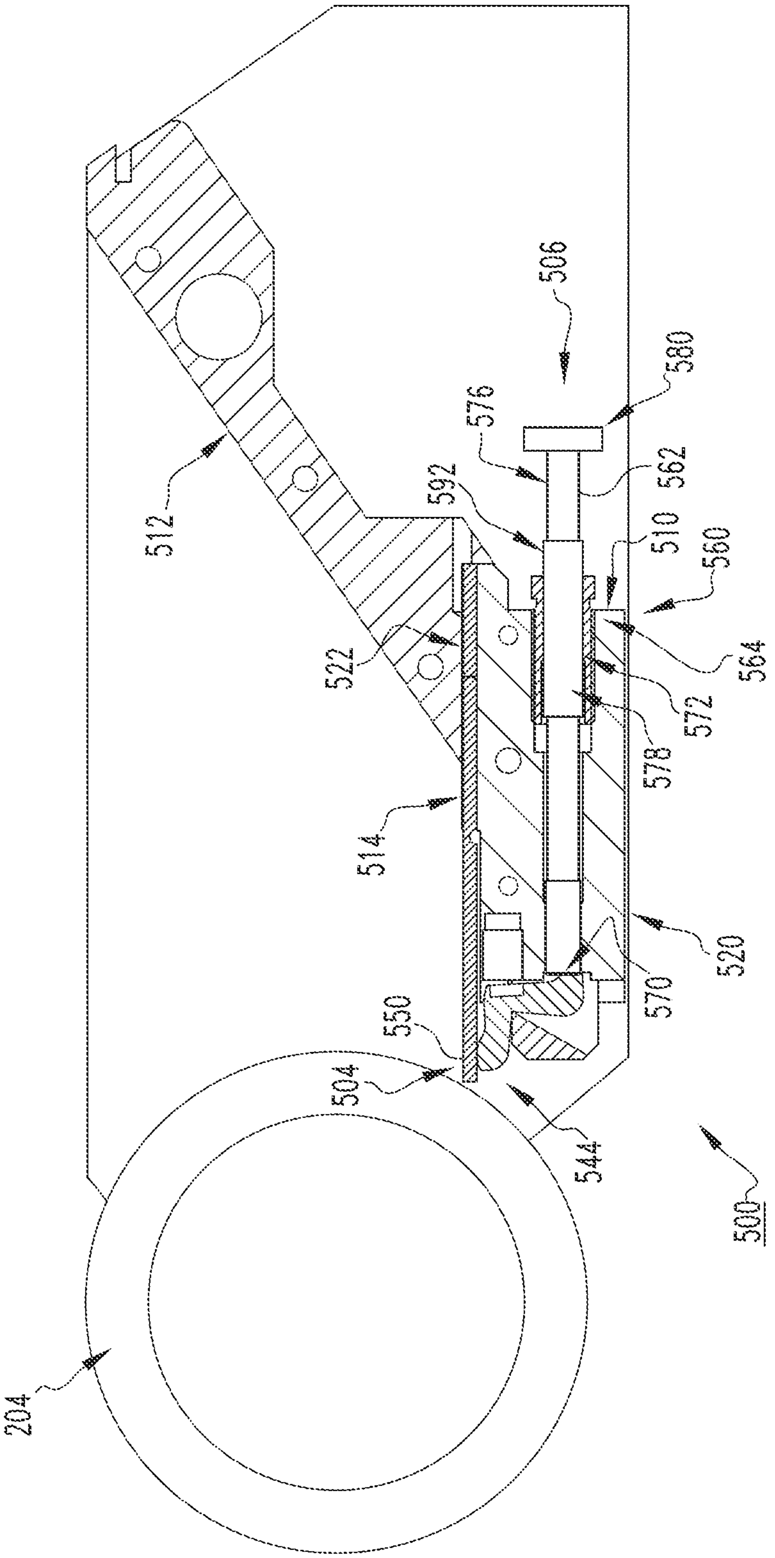
FIG. 7 is a side cross-sectional view of an ink application adjustment assembly.

Initially, the thickness of the ink 400 applied to the fountain roll 204 is controlled by an ink application adjustment assembly 500 which is part of each ink fountain 202. As shown in FIGS. 6 and 7, the ink fountain ink application adjustment assembly 500 (hereinafter and as used herein, the "ink application adjustment assembly 500") is structured to thin, or limit, the amount of ink applied to the fountain roll 204 or thin/limit the amount of ink applied to a portion of the fountain roll 204. The ink application adjustment assembly 500 includes a mounting assembly 502, a blade assembly 504, and an adjustment construct 506. In an exemplary embodiment, as shown, the mounting assembly 502 includes a mounting body 510 (hereinafter, and as used herein, "mounting 510"), a clamp plate 512, a backer plate 514, and two side plates 516, 518, as well as the number of seals (not numbered).

In an exemplary embodiment, the mounting 510 includes a generally planar lower surface 520 and a generally planar upper surface 522. The mounting lower and upper surfaces 520, 522 are, in an exemplary embodiment, at an angle relative to each other. As shown, the angle is about 15 degrees. The clamp plate 512 is a substantially rigid, planar body 530 structured to be, and which is, coupled to the mounting upper surface 522. The backer plate 514 is, in an exemplary embodiment, a planar body 532 made from resilient spring steel and is structured to enhance the bias of the blade assembly 504.

As shown in FIG. 6, the blade assembly 504 includes a blade 540 which is a generally planar, resilient body 542 having a first edge 544. The blade first edge 544 includes a plurality of adjustable portions 546. As set forth below, the blade 540 is disposed adjacent the outer surface of fountain roll 204, as shown in FIG. 7. Thus, the blade first edge adjustable portions 546 are structured to, and do, move between a first position, wherein each blade first edge adjustable portion 546 is spaced from the outer surface of the fountain roll 204, and a second position, wherein each blade first edge adjustable portion 546 closer to the outer surface of fountain roll 204. That is, it is understood that the first position and the second position relative positions wherein the second position is closer to the outer surface of fountain roll 204. Each blade first edge adjustable portion 546 is further structured to be disposed in a number of intermediate positions between the first and second positions.

In an exemplary non-limiting embodiment, shown in FIG. 6, the blade 540 includes a number of elongated segments 550 disposed immediately adjacent each other. Each blade segment 550 includes one blade first edge adjustable portion 546. In another non-limiting embodiment, not shown, the blade body 542 is a unitary body including parallel slits (not shown) extending inwardly from the blade first edge 544. That is, generally, the blade body 542 is similar to a comb, but wherein there is no, or a minimal, gap between the "teeth" of the comb. In another embodiment, not shown, the blade body 542 is a very resilient unitary body wherein a bias applied to one area of the blade first edge 544 is not significantly transmitted to another area of the blade first edge 544.

The adjustment construct 506, in the non-limiting embodiment shown in FIGS. 6 and 7, includes a number of adjustment devices 560. Each adjustment device 560 is associated with, and structured to move, one blade first edge adjustable portion 546 between the first and second positions. That is, in an exemplary embodiment, there is an equal number of adjustment devices 560 and blade first edge adjustable portions 546. Thus, each blade first edge adjustable portion 546 has one associated adjustment device 560. As best shown in FIG. 6, the adjustment devices 560 include a number of elongated bodies 562 each with a movable coupling 564 (FIG. 7). As shown in FIG. 7, each adjustment device body 562 includes a first end 570, a medial portion 572 and a second end 576. Each adjustment device body first end 570 is structured to engage an associated blade segment 550. In an exemplary embodiment, each adjustment device body first end 570 is generally conical and tapered at an angle substantially similar to the angle between the mounting lower and upper surfaces 520, 522. Each adjustment device body medial portion 572 includes a threaded portion 578. The adjustment device body threaded portion 578 is the movable coupling 564, as described below. Each adjustment device body second end 576 includes an actuator which, in an exemplary embodiment, is a coupling 580.

Further, the mounting 510 defines a number of elongated passages 590. The mounting passages 590 extend, in an exemplary embodiment, generally parallel to the mounting lower surface 520. Each mounting passage 590 includes a threaded portion 592. The mounting passages 590 correspond to the adjustment device body 562 and the mounting passage threaded portion 592 is structured to be coupled to the adjustment device body threaded portion 578.

It is understood that the embodiment including the threaded elements 578, 592 is exemplary. In another non-limiting embodiment, not shown, each adjustment device body 562 and each mounting passages 590 is generally smooth. In such an embodiment, each adjustment device body 562 is moved between positions by an actuator (not shown) such as, but not limited to, a DC servo motor (not shown). Although, it will be appreciated that pneumatic actuator assemblies are employed in connection with other aspects and embodiments of the disclosed concept.

The ink fountain ink application adjustment assembly 500 is assembled as follows. The blade 540 is disposed on the mounting upper surface 522 with the plane of the blade 540 substantially corresponding to the plane of the mounting upper surface 522. The backer plate 514 is disposed on the blade 540, and, the clamp plate 512 is disposed on the backer plate 514. The blade 540, backer plate 514, and clamp plate 512 are, in an exemplary embodiment, coupled by fasteners (not shown) that extend into the mounting 510. Each blade first edge adjustable portion 546, that is, each blade segment first edge 544, extends beyond the mounting upper surface 522. Further, the adjustment devices 560 are disposed in the mounting passages 590 with each adjustment device body threaded portion 578 threadably coupled to a mounting passage threaded portion 592. As noted above, in an exemplary embodiment, there are an equal number of blade segments 550 and adjustment devices 560. The mounting passages 590 are positioned so that each adjustment device 560 is generally aligned with a blade segment 550.

In this configuration, when the blade 540, and/or the blade segments 550, are disposed in a plane substantially parallel to the mounting upper surface 522, the blade first edge adjustable portions 546 are in their first positions. That is, when each blade first edge adjustable portion 546 is in the first position, the entire blade body 542 is generally parallel to the mounting upper surface 522. Each adjustment device 560 is moved to a position, e.g. rotated so that the threaded coupling advances the adjustment device 560 longitudinally, until the adjustment device body first end 570 contacts and engages a blade first edge adjustable portion 546. Further longitudinal motion of the adjustment device 560 toward the blade first edge adjustable portions 546 causes the adjustment device body first end 570 to engage and move the associated blade first edge adjustable portion 546 toward the second position.

That is, the ink fountain 202 and the ink fountain ink application adjustment assembly 500 is positioned so that the blade first edge adjustable portion 546, when in the first position, is spaced from the outer surface of the fountain roll 204. When an adjustment device 560 is moved longitudinally toward the blade 540, the engagement of the adjustment device 560 with the associated blade first edge adjustable portion 546 causes the blade first edge adjustable portion 546 to move toward, and then into, the second position. It is understood that the advancement of the adjustment device 560 may be stopped at any position between the first and second positions. It is understood that, when a blade first edge adjustable portion 546 is in the first position, the gap between the fountain roll 204 and blade first edge adjustable portion 546 is, compared to a blade first edge adjustable portion 546 in the second position, large. Thus, the thickness of the ink 400 film applied to the fountain roll 204 is relatively thicker when compared to the thickness of the ink 400 film applied to the fountain roll 204 when the blade first edge adjustable portion 546 is in the second position.

Further, as noted above, the ductor roll 208 reciprocates between two positions; a first position wherein the ductor roll 208 engages the fountain roll 204 thereby causing ink to transfer from the fountain roll 204 to the ductor roll 208 and wherein the ductor roll 208 is spaced from the distributor roll 206, and, a second position, wherein the ductor roll 208 is spaced from the fountain roll 204 and wherein the ductor roll 208 engages the distributor roll 206 thereby causing ink to transfer from the ductor roll 208 to the distributor roll 206. The period of this reciprocation is the "duty cycle" as defined above. It is understood that the longer the duty cycle, the closer the duty cycle is to a 1:1 ratio, the more ink 400 is transferred to the ductor roll 208.

Further, as noted above, the duty cycle adjustment assembly 209 (shown in FIG. 4) is structured to, and does, alter the duty cycle of the ductor roll 208. That is, the duty cycle adjustment assembly 209 is structured to, and does, alter the length of time the ductor roll 208 engages the fountain roll 204. Thus, the duty cycle adjustment assembly 209 is also structured to, and does, alter the amount of ink transferred between the fountain roll 204 and the distributor roll 206.

Thus, as described above, the ink application adjustment assembly 500 and the duty cycle adjustment assembly 209 are structured to alter/limit the amount of ink supplied, or applied, to the downstream rolls of the ink train 402 and the printing plate 224.

Further, it is understood that each ink station assembly 200 applies a single color ink image to the blanket wheel 112 and/or an image transfer segment 114. As is known in the art, the individual ink images must be substantially "registered" relative to each other. As used herein, the "registration" of an "ink image" means that each ink image is substantially in the proper position relative to the other ink images so that the plurality of ink images form the main image. It is further understood that each plate cylinder 222 (and/or the elements thereof) must be positioned so as to ensure the ink images are in proper registration. To accomplish this, each printing plate cylinder assembly 221 includes a printing plate cylinder axial adjustment assembly 226 and a circumferential adjustment assembly 228 as noted above, and as shown schematically in FIG. 3.

Further, each ink image, the main image, and/or the can body applied image must have the proper sidelay registration and circumferential registration. Referring to FIG. 3, the axial adjustment assembly 226 is structured to move the printing plate cylinder 222 in an axial direction relative to the printing plate cylinder 222 axis of rotation. That is, the axial adjustment assembly 226 is structured to, and does, alter the sidelay registration of the main image. That is, as the axial position of each ink image is moved axially (while being brought into proper sidelay registration with the other ink images), the position of the main image is moved axially relative to the can body upon which the main image is applied.

In an exemplary non-limiting embodiment, the axial adjustment assembly 226 includes a mounting 227 and an actuator 229, both shown in simplified form in FIG. 3. The axial adjustment assembly mounting 227 is structured to, and does, rotatably support the printing plate cylinder 222 (and/or the axle (not numbered) of the printing plate cylinder 222). The axial adjustment assembly mounting 227 is movable coupled to the printing unit frame assembly 22. The axial adjustment assembly actuator 229 is structured to move the axial adjustment assembly mounting 227 relative to the printing unit frame assembly 22 so that the printing plate cylinder 222 moves in an axial direction. It is understood that as the printing plate cylinder 222 moves in an axial direction, the location of the ink image (and/or the main image) changes position on the blanket wheel 112 and/or an image transfer segment 114. The change in position of the ink image (and/or the main image) on the blanket wheel 112 and/or an image transfer segment 114 changes the position of the can body applied image on the can body 300 (FIG. 2). That is, the position of the can body applied image on the can body 300 (FIG. 2) is moved in an axial direction on the can body 300 (FIG. 2). Stated alternately, the sidelay registration of the can body applied image is changed by the axial adjustment assembly 226. Thus, the axial adjustment assembly 226 is structured to, and does, alter the sidelay registration of the can body applied image.

The circumferential adjustment assembly 228, also shown schematically in FIG. 3, is structured to alter the circumferential registration of the can body applied image. As noted above, and as known in the art, a circumferential adjustment assembly 228 includes bearings on the printing cylinder shaft which are driven by a helical gear mounted to the shaft (not shown). A plate cylinder gear (not shown) is driven by a larger gear (not shown) mounted on the blanket wheel. It is also a helical gear. The plate cylinder helical gear is rotationally keyed to the shaft, but it is allowed to move axially on the shaft. A linear screw mechanism (not shown) is used to move the helical gear axially on the shaft while the machine is running. The axial movement of the plate cylinder gear causes the shaft to rotatably advance or retard its timing proportional to the helix angle of the gear. This advances or retards the location of the ink image on the blanket for that particular color. These elements are collectively and schematically represented by box 228 on FIG. 3. The circumferential adjustment assembly 228 further includes an actuator 233 (shown schematically) that is structured to, and does, actuate the linear screw mechanism.

The can decorator machine 100 and/or the ink application system 104, further includes an image control, system 600 (shown schematically in FIG. 2). The image control system 600 is structured to automatically adjust the ink image of each ink station assembly 200 as well as the main image applied to the blanket wheel 112 and/or an image transfer segment 114. Stated alternately, the image control system 600 is structured to automatically adjust the thickness of the ink 400 in the ink train 402 and the sidelay registration and circumferential registration of each ink image and/or the main image.

Figure 8:
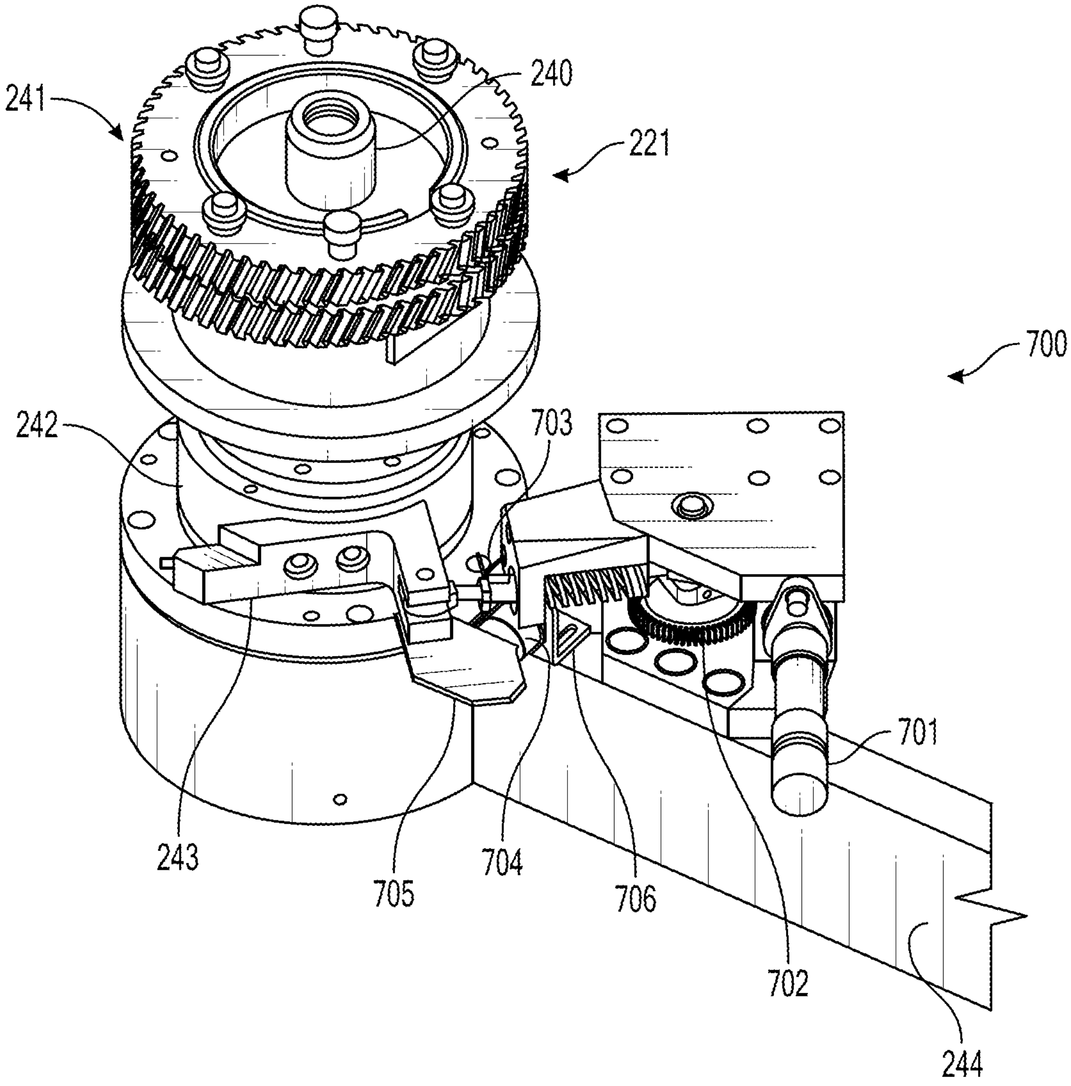
FIG. 8 is an isometric view of a printing plate cylinder pressure adjustment assembly operatively coupled to a printing cylinder assembly.
Figure 9:
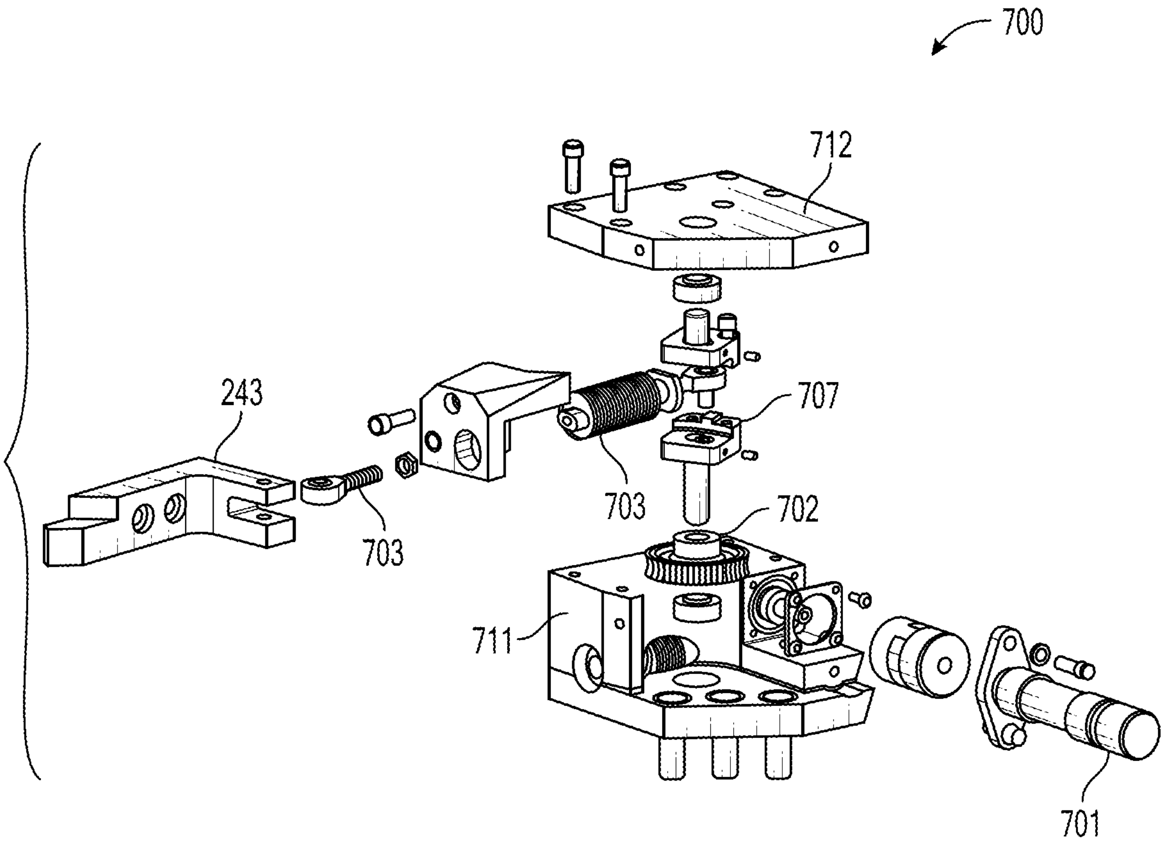
FIG. 9 is an exploded view of the printing plate cylinder pressure adjustment assembly.
Figure 10:
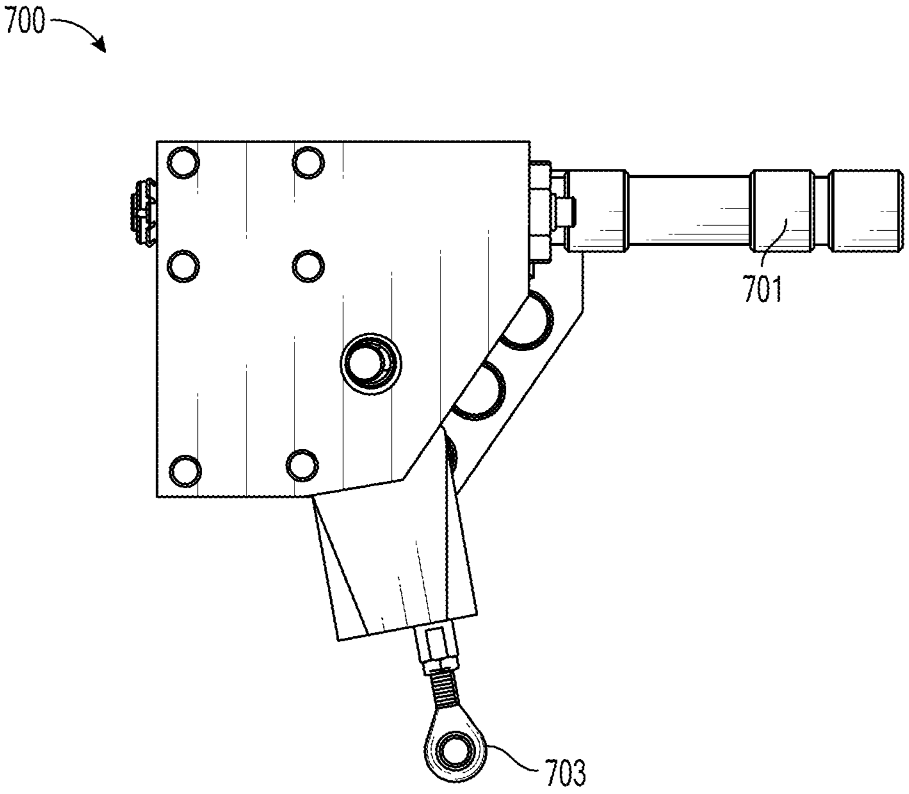
FIG. 10 is a top elevations view of the printing plate cylinder pressure adjustment assembly.
Figure 11:
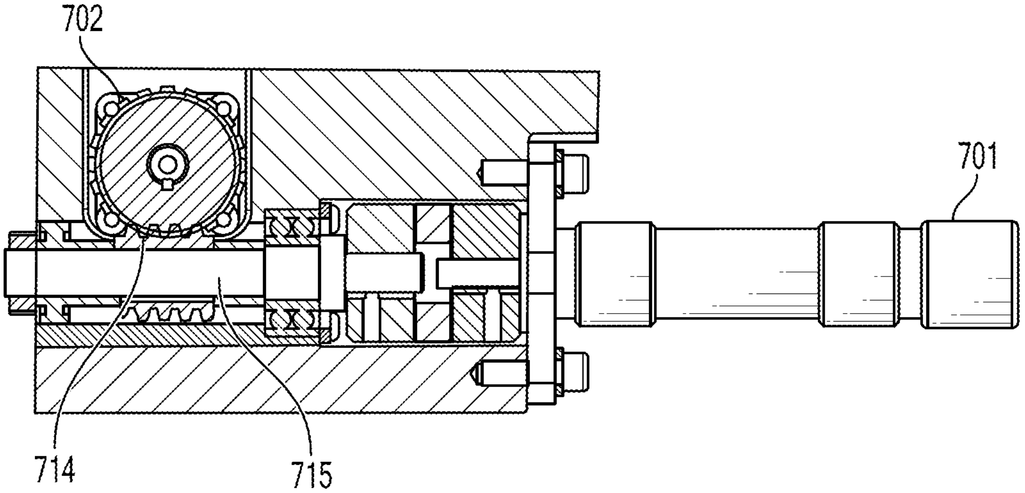
FIG. 11 is a top elevation view of the printing plate cylinder pressure adjustment assembly shown in partial cross-section to illustrate a worm gear drive mechanism.
Figure 12:
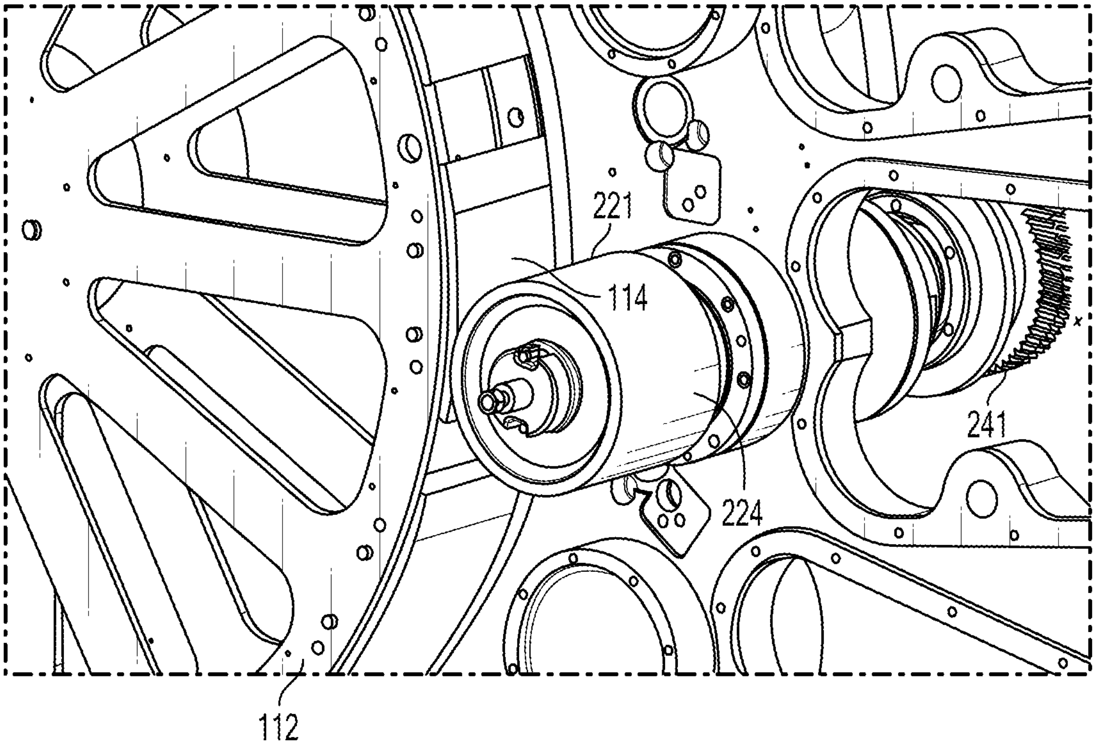
FIG. 12 is an isometric view of a printing plate cylinder assembly and the blanket wheel.

In an exemplary embodiment, the can decorator 100 further includes a printing plate cylinder pressure adjustment assembly 700. FIG. 8 is an isometric view of the printing plate cylinder pressure adjustment assembly 700 operatively coupled to the printing cylinder assembly 221. FIG. 9 is an exploded view of the printing plate cylinder pressure adjustment assembly 700. FIG. 10 is a top elevation view of the printing plate cylinder pressure adjustment assembly 700 and FIG. 11 is a top elevation view of the printing plate cylinder pressure adjustment assembly 700 shown in partial cross-section to illustrate the worm gear drive mechanism. FIG. 12 is an isometric view of the printing plate cylinder assembly 221 and the blanket wheel 112.

The printing plate cylinder assembly 221 includes a printing plate cylinder drive shaft 240. Rotation of the printing plate cylinder drive shaft 240 causes rotation of the printing plate 224 (FIG. 3). The printing plate cylinder drive shaft 240 is driven via a printing plate cylinder drive gear 241.

The printing plate cylinder adjustment assembly 700 includes an actuator, such as, for example and without limitation, an air motor 701 operatively coupled to a worm gear 702 such that operation of the air motor 701 causes turning of the worm gear 702. The worm gear 702 is operatively coupled to an elongated member such as, for example and without limitation, a turnbuckle assembly 703 such that turning of the worm gear 702 causes movement of the turnbuckle assembly 703 via an eccentric pivot 707. The turnbuckle assembly 703 is in turn operatively coupled to an eccentric bushing 242 via an eccentric bushing bracket 243 such that movement of the turnbuckle assembly 703 causes corresponding movement of the eccentric bushing 242. The eccentric bushing 242 is disposed around the printing plate cylinder drive shaft 240 of the printing plate cylinder assembly 221. The eccentric bushing 242 has an eccentric shape such that rotation of the eccentric bushing 242 will cause the printing plate cylinder drive shaft 240, and thus the printing plate 224 (FIG. 3) to move closer or further from the blanket wheel 112. In an exemplary embodiment, an inner circumference of the eccentric bushing 242 has an eccentric shape, which causes the priming plate cylinder drive shaft 240 to move towards or away from the blanket wheel 112 as the eccentric bushing 242 is rotated. In this manner, the printing plate 224 pressure against the blanket wheel 112 can be increased by moving the printing plate cylinder drive shaft 240 toward the blanket wheel 112 and decreased by moving the printing plate cylinder drive shaft 240 away from the blanket wheel 112.

The worm gear drive mechanism in an exemplary embodiment is shown in more detail in FIG. 11. The worm gear drive mechanism includes a worm gear drive shaft 715 and a worm drive gear 714 coupled to the worm gear drive shaft 715. The worm drive gear 714 includes teeth corresponding to teeth of the worm gear 702. Operation of the air motor 701 causes the drive shaft 715 to move linearly. As the drive shaft 715 moves linearly, the teeth of the worm drive gear 714 interact with the teeth of the worm gear 702 to cause the worm gear 702 to rotate.

The worm gear 702 is coupled to the eccentric pivot 707 (shown best in FIG. 9). Thus, rotation of the worm gear 702 causes rotation of the eccentric pivot 707. The eccentric pivot 707 has an eccentric shape and is coupled to the turnbuckle assembly 703 such that rotation of the eccentric pivot 707 causes movement of the turnbuckle assembly 703. Since the turnbuckle assembly 703 is coupled to the eccentric bushing bracket 243, this movement also causes rotation of the eccentric bushing 242 around the printing plate cylinder drive shaft 240. In this manner, rotation of the eccentric bushing 242, and thus, the pressure of the printing plate 224 against the blanket wheel 112 can be finely controlled via operation of the air motor 701.

Together, the worm gear drive mechanism, the worm gear 702, the eccentric pivot 707, and the turnbuckle assembly 703 may be considered a drive mechanism coupled between the air motor 701 and the eccentric bushing 242, and operation of the air motor 701 causes the drive mechanism to rotate the eccentric bushing 242.

In an exemplary embodiment, the printing plate cylinder pressure adjustment assembly 700 includes a reducer assembly. As used herein, a "reducer assembly" means a construct that decreases the output motion generated by an air motor for a given amount of compressed air energy (e.g., without limitation, as measured in revolutions per minute, RPMs). For example, if a given air motor used "X" amount of compressed air energy to generate ten rotations in an output shaft, a "reducer assembly" would convert that motion to a single rotation when the same air motor uses "X" amount of compressed air energy. Further, in an exemplary embodiment, a "reducer assembly" is preceded by an indicator in the form of "[number] X" that indicates the amount of reduction. For example, a "10X reducer assembly" is structured to, and does, reduce the output of an air motor by a factor often. That is, if a given air motor used "X" amount of compressed air energy to cause a sliding element to move ten inches, the same air motor with a "10X reducer assembly" using. "X" amount of compressed air energy would cause the sliding element to move one inch. The reducer assemblies discussed herein are, in a non-limiting exemplary embodiment, at least one of a 30X reducer assembly, and a 101X reducer assembly. Further, it will be appreciated that the disclosed concept preferably utilizes a combination of reducer assemblies. For example and without limitation, in one non-limiting embodiment, a first reducer assembly may be a gearbox having a reduction ratio of 100:1 combined in series with a second reducer assembly, which may be a worm gear having a reduction ratio of 30:1X for a total ratio of 3,000:1. In an exemplary embodiment, the worm gear 702 and the worm drive gear 714 may serve as the second reducer assembly while a gearbox within the air motor 701 may serve as a first reducer assembly. However, it will be appreciated that additional or different reducer assemblies may be employed in the disclosed concept.

The printing plate cylinder pressure adjustment assembly 700 in an exemplary embodiment also includes a lower housing 711 and an upper housing 712. The lower and upper housing 711,712 are structured to couple together to form a housing to house components of the printing plate cylinder pressure adjustment assembly 700. The housing may be fixedly coupled to a fixed structure 244 of the can decorator 100 to fixedly secure the printing plate cylinder adjustment assembly 700 in place with respect to the printing plate cylinder assembly 221.

In an exemplary embodiment, a sensor assembly may be used to determine the printing plate pressure. The sensor assembly in an exemplary embodiment includes a sensor 704 coupled to the fixed structure 244 via a sensor bracket 706. A sensor target 705 is coupled to the eccentric bushing bracket 243. The sensor 704 is structured to sense a position of the sensor target 705. Since the sensor target 705 is coupled to the eccentric bushing bracket 242, changes in position of the sensor target 705 will correspond to rotation of the eccentric bushing 242, which, as described above, corresponds to changes in pressure of the printing plate 224 against the blanket wheel 112. The sensor 704 may be any suitable type of sensor such as, without limitation, a position sensor.

FIG. 12 is an isometric view of the printing plate cylinder assembly 221 and the blanket wheel 112 in art exemplary embodiment. As shown in FIG. 12, the printing plate cylinder drive gear 241 is disposed on an opposite side of a can decorator-wall as the printing plate 224. The printing plate cylinder pressure adjustment assembly 700 is hidden in FIG. 12 and may disposed on the same side of the wall as the printing plate cylinder drive gear 241.

Figure 13:
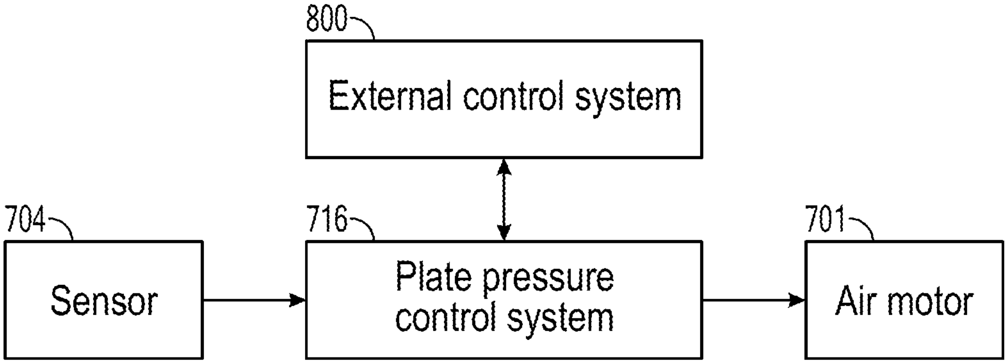
FIG. 13 is a schematic diagram of a control system for the printing plate cylinder pressure adjustment assembly.

In an exemplary embodiment of the disclosed concept, the printing plate cylinder adjustment assembly 700 may be controlled electronically. FIG. 13 is a schematic diagram of a control system for the printing plate cylinder adjustment assembly 700 in accordance with an exemplary embodiment. The printing plate cylinder adjustment assembly 700 includes a plate pressure control system 716. The plate pressure control system 716 may include a controller, a processor, circuitry, or any other suitable components for controlling the air motor 701. The plate pressure control system 716 receives input from the sensor 704 and controls the air motor 701. The plate pressure control system 716 may control the air motor 701 to achieve a desired pressure of the printing plate 224 against the blanket wheel 112 based on the output of the sensor 704. The plate pressure control system 716 may also receive input or commands from an external control system 800. The input may be, for example, the desired pressure. The external control system 800 may be located at or remote to the can decorator 100. In an exemplary embodiment, the external control system 800 is remote with respect to the can decorator 100, allowing remote adjustment of the pressure, such as by a remotely located technician using the external control system 800. It will be appreciated that the external control system 800 may utilize wired or wireless communication to provide inputs or commands to the plate pressure control system 716. It will also be appreciated that the external control system 800 may utilize one or more networks, such as, for example and without limitation, internet or cellular communication networks, to provide inputs or commands to the plate pressure control system 716. In an exemplary embodiment, the external control system 800 may use one or more feedback mechanisms to determine the desired pressure. For example and without limitation, the external control system 800 may use image data of can images to determine whether to increase or decrease the desired pressure.

In an example embodiment, the plate pressure system 716 may use one or more control algorithms to control the air motor 701 to adjust the pressure of the printing plate 224 against the blanket wheel 112. For example, backlash can be an issue in adjusting the pressure. In an exemplary embodiment, a control algorithm reduces backlash. For example, the control algorithm may approach the desired pressure using fine incremental adjustments from only one direction. That is, the control algorithm may incrementally increase the pressure in small, fine steps until the desired pressure is reached. As used herein, a “fine” adjustment preferably means moving an element less than 0.001 inch and more preferably less than 0.0005 inch. As an example, if the pressure is below the desired pressure, the plate pressure control system 716 will control the air motor 701 to increase the pressure in fine incremental steps until the desired pressure is reached. In the case that the pressure is above the desired pressure, or if the pressure adjustment overshoots the desired pressure, the plate pressure control system 716 will first control the air motor 701 to reduce the pressure by a larger amount to bring the pressure below the desired pressure. Then, the plate pressure control system 716 will control the air motor 701 to incrementally increase the pressure in small, fine steps until the desired pressure is reached. The process of incrementally approaching the desired pressure from one direction in fine steps, for example small, fine steps to increase the pressure, reduces or eliminates backlash in the system.

In an exemplary embodiment, the can decorator 100 includes an image control system 600 (shown in FIG. 2). The image control system 600 includes an electronic can decorator control assembly 602, a mechanical can decorator control assembly 604 and a number of sensors 606. The electronic can decorator control assembly 602 includes a programmable logic circuit 610 and a number of modules 612. The electronic can decorator control assembly 602 is structured to determine if the can body applied image has the proper amount of ink and that the ink images/the main image is/are in the proper location. The image control system 600 may be part of or in communication with the external control system 800. However, it will be appreciated that in some exemplary embodiments, the image control system 600 may be omitted.

In an exemplary embodiment, the electronic can decorator control assembly modules 612 includes a database module 620 having decorated can image data and a comparison module 622. As used herein, “decorated can image data” means data representing the intended image. Further, the electronic can decorator control assembly database module 620 is structured to include a number of decorated can image data sets with each decorated can image data set being associated with a specific main image. That is, for example, one decorated can image data set represents the main image for a can containing a cola beverage and another decorated can image data set represents the main image for a can containing a beer beverage. The electronic can decorator control assembly comparison module 622 is structured to compare an image signal to the associated can image data from the database module so as to determine if the image signal is acceptable. As used herein, “acceptable” means that the can body applied image/ink images/main image is substantially the intended image, as would be understood by those of skill in the art. For example and without limitation, an acceptable registration in accordance with an embodiment of the disclosed concept is preferably within about 0.001 inch of the intended image position and, more preferably, within about 0.0005 inch of the intended image position. It is understood that those of skill in the art are capable of creating, and do create, can image data that is an electronic construct representing the intended image.

In an exemplary embodiment, the electronic can decorator control assembly comparison module 622 is structured to determine if the image signal indicates that a can body applied image includes one of an insufficient amount of ink or an excessive amount of ink. As used herein, an “insufficient amount of ink” means that the amount of ink in the can body applied image/ink images/main image is less than the amount needed to create the intended image as would be understood by those of skill in the art. As used herein, an “excessive amount of ink” means that the, amount of ink in the can body applied image/ink images/main image is more than the amount needed to create the intended image as would be understood by those of skill in the art.

Further, in an exemplary embodiment, the electronic can decorator control assembly comparison module 622 is structured to determine if the image signal indicates that the can body applied image includes an axially offset image. As used herein, an “axially offset image” means that the can body applied image/ink images/main image is not in the proper location. That is, an “axially offset image” does not have the intended sidelay registration.

Further, in an exemplary embodiment, the electronic can decorator control assembly comparison module 622 is structured to determine if the image signal indicates that the can body applied image includes a circumferentially offset image. As used herein, a "circumferentially offset image" means that the can body applied image/ink image/main image is not in the proper location. That is, a "circumferentially offset image" does not have the intended circumferentially registration.

Further aspects of the electronic can decorator control assembly comparison module 622 are discussed below following the discussion of the mechanical can decorator control assembly 604 and the number of sensors 606.

The mechanical can decorator control assembly 604 is structured to be operatively coupled to at least one of the ink application adjustment assembly 500, the ductor roll assembly duty cycle adjustment assembly 209, the printing plate cylinder assembly axial adjustment assembly 226, the printing plate cylinder assembly circumferential adjustment assembly 228, or the printing plate cylinder pressure adjustment assembly 700. That is, generally, the mechanical can decorator control assembly 604 includes an actuator 650 (as used herein, the reference number 650 represents a generic actuator or any actuator of the mechanical can decorator control assembly. Specific actuators are discussed below). The mechanical can decorator control assembly actuator 650 is structured to actuate the associated construct, i.e., one of the ink application adjustment assembly 500, the ductor roll assembly duty cycle adjustment assembly 209, the printing plate cylinder assembly axial adjustment assembly 226, the printing plate cylinder assembly circumferential adjustment assembly 228, or the printing plate cylinder pressure adjustment assembly 700.

In an exemplary embodiment, the mechanical can decorator control assembly 604 includes at least one, or, a number of, ink application adjustment assembly actuator(s) 652 (FIG. 3, shown schematically). Each ink application adjustment assembly actuator 652 is structured to be, and is, operatively coupled to an ink application adjustment assembly adjustment device 560. That is, each ink application adjustment assembly actuator 652 is structured to, and does, move an ink application adjustment assembly adjustment device 560 between the first and second positions as well as any intermediate position. In an exemplary embodiment, each ink application adjustment assembly actuator 652 is structured to, and is, operatively coupled to an adjustment device body second end coupling 580.

In an exemplary embodiment, the mechanical can decorator control assembly 604 includes a number of ductor roll assembly duty cycle adjustment actuators 654 (FIG. 3, shown schematically). Each ductor roll assembly duty cycle adjustment actuator 654 is structured to, and does, actuate the ductor roll assembly duty cycle adjustment assembly so as to adjust the amount of ink applied to the printing plate cylinder assembly. That is, each ductor roll assembly duty cycle adjustment actuator 654 is structured to, and does, actuate the duty cycle adjustment assembly 209 so as to alter the length of time the associated ductor roll 208 engages the fountain roll 204.

In an exemplary non-limiting embodiment, the mechanical can decorator control assembly 604 includes a number of printing plate cylinder assembly axial adjustment assembly actuators 656 (FIG. 3, shown schematically). In an exemplary non-limiting embodiment, each printing plate cylinder assembly axial adjustment assembly actuator 656 is structured to be, and is, operatively coupled to the axial adjustment assembly 226. In another exemplary non-limiting embodiment, each printing plate cylinder assembly axial adjustment assembly actuator 656 is an axial adjustment assembly mounting actuator 229. That is, an axial adjustment assembly mounting actuator 229 is, as used herein, both part of the axial adjustment assembly 226 and the mechanical can decorator control assembly 604.

In an exemplary non-limiting embodiment, the mechanical can decorator control assembly 604 includes a number of printing plate cylinder assembly circumferential adjustment assembly actuators 658 (FIG. 3, shown schematically). Each printing plate cylinder assembly circumferential adjustment assembly actuator 658 is structured to be, and is, operatively coupled to the circumferential adjustment assembly 228. In another exemplary non-limiting embodiment, each printing plate cylinder assembly circumferential adjustment assembly actuator 658 is a circumferential adjustment assembly actuator 233. That is, as used herein, a circumferential adjustment assembly actuator 233 is both part of the circumferential adjustment assembly 228 and the mechanical can decorator control assembly 604.

In an exemplary non-limiting embodiment, the mechanical can decorator control assembly 604 includes a number of printing plate cylinder pressure adjustment assembly actuators. For example and without limitation, the mechanical can decorator control assembly 604 may include the air motor 701 of the printing plate cylinder pressure adjustment assembly 700.

In an exemplary non-limiting embodiment, a number, a plurality or all mechanical can decorator control assembly actuators 650 include an air motor 670 (FIG. 2, shown schematically). As used herein, an "air motor" means a construct that expands a compressed gas and converts the compressed air energy to mechanical work through either linear motion, rotary motion, or any other motion. As is known, the area in which a can decorator machine 100 operates is often filled with ink particles including airborne particles. As such, it is, in some instances, dangerous to operate motors that generate flame or sparks that can ignite airborne particles. Thus, as used herein, an "air motor" further excludes any type of motor that utilizes combustion or that generates/used electricity. That is, a motor that utilizes combustion or that generates/used electricity is not an "air motor" or the equivalent of an "air motor."

The number of sensors 606, in an exemplary non-limiting embodiment, includes a number of image sensors. As used herein, an "image" sensor means a sensor that is structured to convert an image into data, including a signal incorporating data, representing characteristics of the can body applied image/ink images/main image. In a non-limiting exemplary embodiment, the image sensors are digital cameras. In an exemplary embodiment, the image sensors are disposed adjacent the can body 300 path on the can transport assembly 102. Each sensor 606, i.e., each image sensor/digital camera, is structured to generate an image signal including data representing the can body applied image characteristic(s). In an exemplary embodiment, the image signal includes data representing the thickness of the can body applied image/ink images/main image, i.e., ink thickness characteristic data. In an exemplary embodiment, the image signal includes data representing the sidelay registration of the can body applied image/ink images/main image, i.e., sidelay registration characteristic data. In an exemplary embodiment, the image signal includes data representing the circumferential registration of the can body applied image/ink images/main image, i.e., circumferential registration characteristic data. Further, each sensor 606, i.e., each image sensor/digital camera, is structured to communicate the image signal to the electronic can decorator control assembly 602.

Thus, the electronic can decorator control assembly 602 is structured to receive the image signal from the number of sensors 606. Further, the electronic can decorator control assembly 602, i.e., the electronic can decorator control assembly comparison module 622, is structured to compare the image signal (i.e., the data representing the image characteristic data as incorporated into the signal) to associated can image data from the database module 620 so as to determine if the image signal is acceptable. That is, for example, the electronic can decorator control assembly comparison module 622, is structured to determine if the image signal indicates that the can body applied image/ink images/main image includes one of an insufficient amount of ink or an excessive amount of ink. That is, the electronic can decorator control assembly comparison module 622, is structured to compare the ink thickness characteristic data to a record of an acceptable ink thickness in the electronic can decorator control assembly database module 620.

Further, or alternately, the electronic can decorator control assembly comparison module 622, is structured to determine if the image signal indicates that the can body applied image/ink images/main image includes an axially offset image. Further, or alternately, the electronic can decorator control assembly comparison module 622, is structured to, and does, determine if the image signal indicates that the can body applied image includes a circumferentially offset image.

If a can body applied image/ink images/main image is not acceptable, the image control system 600, i.e., the electronic can decorator control assembly 602, is structured to send a corrective signal to selected elements of the mechanical can decorator control assembly 604 so as to adjust at least one of the ink fountain ink application adjustment assembly 500, the ductor roll assembly duty cycle adjustment assembly 209, the printing plate cylinder assembly axial adjustment assembly 226, the printing plate cylinder assembly circumferential adjustment assembly 228, or the printing plate cylinder pressure adjustment assembly 700. For example, if the electronic can decorator control assembly comparison module 622 determines that the can body applied image includes one of an insufficient amount of ink or an excessive amount of ink, the electronic can decorator control assembly 602 is structured to actuate the mechanical can decorator control assembly 604 to further actuate at least one of the ink fountain ink application adjustment assembly 500, the ductor roll assembly duty cycle adjustment assembly 209, or the printing plate pressure cylinder adjustment assembly 700 so as to adjust the amount of ink applied to the printing plate cylinder assembly and/or the blanket wheel. As a further example, if the electronic can decorator control assembly comparison module 622 determines that the can body applied image includes an axially offset image, the electronic can decorator control assembly 602 is structured to actuate the mechanical can decorator control assembly 604 to further actuate the printing plate cylinder assembly axial adjustment assembly 226 so as to adjust the axial position of the can body applied image. As a further example, if the electronic can decorator control assembly comparison module 622 determines that the can body applied image includes a circumferentially offset image, the electronic can decorator control assembly 602 is structured to actuate the mechanical can decorator control assembly 604 to further actuate the printing plate cylinder assembly circumferential adjustment assembly 228 so as to adjust the circumferential position of the can body applied image.

It will be appreciated that in some exemplary embodiments, the image control system 600 may be omitted. In an exemplary embodiment, the external control system 800 may remotely control one or more of the ink application adjustment assembly 500, the ductor roll assembly duty cycle adjustment assembly 209, the printing plate cylinder assembly axial adjustment assembly 226, the printing plate cylinder assembly circumferential adjustment assembly 228, or the priming plate cylinder pressure adjustment assembly 700.

Accordingly, the disclosed concept provides for automation and control of numerous inspection and adjustment operations that have heretofore been required to be manually done by an operator. Moreover, the precision afforded by the disclosed concept substantially reduces, if not completely eliminates, scrap cans and lost production caused by image quality defects.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A printing plate pressure adjustment system for a can decorator including a printing plate cylinder assembly having a printing plate cylinder, a printing plate cylinder drive shaft, and a blanket wheel, said system comprising:

an actuator;

a control system structured to control operation of the actuator to adjust a pressure between the printing plate cylinder assembly and the blanket wheel;

an eccentric bushing disposed around the printing plate cylinder drive shaft, wherein rotation of the eccentric bushing causes the printing plate cylinder to move toward or away from the blanket wheel; and a drive mechanism coupled between the actuator and the eccentric bushing, the drive mechanism including an elongated member coupled to the eccentric bushing, wherein operation of the actuator causes the elongated member to move to rotate the eccentric bushing, wherein the control system is structured to adjust the pressure between the printing plate cylinder and the blanket wheel to a desired pressure, wherein the control system is structured to control the actuator such that the printing plate cylinder moves away from the blanket wheel in a large step greater than 0.001 inch and to subsequently control the actuator such that the printing plate cylinder moves toward the blanket wheel in fine incremental steps of less than 0.001 inch until the desired pressure between the printing plate cylinder assembly and the blanket wheel is reached.

2. The printing plate pressure adjustment system of claim 1, wherein the actuator is an air motor.

3. The printing plate pressure adjustment system of claim 1, wherein the drive mechanism comprises:

a worm gear structured to rotate in response to operation of the actuator, wherein rotation of the worm gear causes the elongated member to move.

4. The printing plate pressure adjustment system of claim 3, wherein the drive mechanism further comprises:

a drive shaft coupled to the actuator and structured to move linearly in response to operation of the actuator; and a worm drive gear coupled to the drive shaft and structured to interact with the worm gear to rotate the worm gear in response to linear movement of the drive shaft.

5. The printing plate pressure adjustment system of claim 1, wherein the drive mechanism comprises:

an eccentric pivot operatively structured to rotate in response to operation of the actuator, wherein the elongated member is coupled between the eccentric pivot and the eccentric bushing, and wherein rotation of the eccentric pivot causes the elongated member to move.

6. The printing plate pressure adjustment system of claim 1, further comprising:

an eccentric bushing bracket coupled between the eccentric bushing and the elongated member.

7. The printing plate pressure adjustment system of claim 1, further comprising:

a sensor target coupled to the eccentric bushing and structured to move in conjunction with rotation of the eccentric bushing; and a sensor structured to sense a position of the sensor target, wherein the control system is structured to control operation of the actuator based on an output of the sensor.

8. The printing plate pressure adjustment system of claim 7, wherein a predetermined position of the sensor target corresponds to thea desired pressure between the printing plate cylinder assembly and the blanket wheel, and wherein the control system is structured to control the actuator such that the position of the sensor target is the predetermined position corresponding to the desired pressure between the printing plate cylinder assembly and the blanket wheel.

9. The printing plate pressure adjustment system of claim 1, wherein the control system is structured to control the actuator based on an input from an external control system.

10. The printing plate pressure adjustment system of claim 9, wherein the external control system is located remotely from the can decorator.

11. A printing plate pressure adjustment system for a can decorator including a printing plate cylinder assembly having a printing plate cylinder, a printing plate cylinder drive shaft, and an eccentric bushing disposed around the printing plate cylinder drive shaft, and a blanket wheel, wherein rotation of the eccentric bushing causes the printing plate cylinder to move toward or away from the blanket wheel, said system comprising:

an actuator;

a drive mechanism coupled between the actuator and the eccentric bushing, the drive mechanism including:

an elongated member coupled to the eccentric bushing, wherein operation of the actuator causes the elongated member to move to rotate the eccentric bushing; and a worm gear structured to rotate in response to operation of the actuator, wherein rotation of the worm gear causes the elongated member to move, wherein the actuator is an air motor; and wherein the drive mechanism further comprises:

an eccentric pivot operatively structured to rotate in response to operation of the actuator, wherein the elongated member is coupled between the eccentric pivot and the eccentric bushing, and wherein rotation of the eccentric pivot causes the elongated member to move.

12. The printing plate pressure adjustment system of claim 11, wherein the drive mechanism further comprises:

a drive shaft coupled to the actuator and structured to move linearly in response to operation of the actuator; and a worm drive gear coupled to the drive shaft and structured to interact with the worm gear to rotate the worm gear in response to linear movement of the drive shaft.

13. A can decorator comprising:

a blanket wheel;

a printing plate cylinder assembly having a printing plate cylinder, a printing plate cylinder drive shaft, and an eccentric bushing disposed around the printing plate cylinder drive shaft, wherein rotation of the eccentric bushing causes the printing plate cylinder to move toward or away from the blanket wheel; and a printing plate pressure adjustment assembly including:

an actuator;

a control system structured to control operation of the actuator to adjust a pressure between the printing plate cylinder assembly and the blanket wheel; and a drive mechanism coupled between the actuator and the eccentric bushing, the drive mechanism including an elongated member coupled to the eccentric bushing, wherein operation of the actuator causes the elongated member to move to rotate the eccentric bushing, wherein the control system is structured to adjust the pressure between the printing plate cylinder and the blanket wheel to a desired pressure, wherein the control system is structured to control the actuator such that the printing plate cylinder moves away from the blanket wheel in a large step greater than 0.001 inch and to subsequently control the actuator such that the printing plate cylinder moves toward the blanket wheel in fine incremental steps of less than 0.001 inch until the desired pressure between the printing plate cylinder assembly and the blanket wheel is reached.

14. The can decorator of claim 13, wherein the actuator is an air motor.

15. The can decorator of claim 13, wherein the drive mechanism comprises:

a worm gear structured to rotate in response to operation of the actuator, wherein rotation of the worm gear causes the elongated member to move.

16. The can decorator of claim 13, wherein the drive mechanism comprises:

an eccentric pivot operatively structured to rotate in response to operation of the actuator, wherein the elongated member is coupled between the eccentric pivot and the eccentric bushing, and wherein rotation of the eccentric pivot causes the elongated member to move.

* * * * *